United States Patent
Lim et al.

(10) Patent No.: US 12,294,058 B2
(45) Date of Patent: May 6, 2025

(54) ELECTRODE ASSEMBLY AND MANUFACTURING METHOD OF THE SAME

(71) Applicant: LG ENERGY SOLUTION, LTD., Seoul (KR)

(72) Inventors: Si Hyoun Lim, Daejeon (KR); Sangyeon Won, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 581 days.

(21) Appl. No.: 17/694,041

(22) Filed: Mar. 14, 2022

(65) Prior Publication Data

US 2022/0285738 A1    Sep. 8, 2022

(30) Foreign Application Priority Data

Mar. 4, 2021 (KR) .................. 10-2021-0029072

(51) Int. Cl.
*H01M 10/0587* (2010.01)
*H01M 4/02* (2006.01)
(Continued)

(52) U.S. Cl.
CPC ..... *H01M 10/0587* (2013.01); *H01M 4/0404* (2013.01); *H01M 4/366* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| 6,692,863 B1 | 2/2004 | Nakanishi et al. |
| 10,243,177 B2 * | 3/2019 | Kanemoto .......... H01M 50/107 |

(Continued)

FOREIGN PATENT DOCUMENTS

| CN | 2909547 Y | 6/2007 |
| CN | 203746954 U | 7/2014 |

(Continued)

OTHER PUBLICATIONS

Huang et al. ("An in-situ polymerized solid polymer electrolyte enables excellent interfacial compatibility in lithium batteries", Electrochimica Acta 299, Mar. 10, 2019, pp. 820-827) (Year: 2019).*

*Primary Examiner* — Jonathan G Jelsma
*Assistant Examiner* — James A Corno
(74) *Attorney, Agent, or Firm* — Birch, Stewart, Kolasch & Birch, LLP (57) ABSTRACT

An electrode assembly includes a positive electrode member including a positive electrode current collector and a positive electrode active material coating layer formed on the positive electrode current collector; and a negative electrode member including a negative electrode current collector and a negative active material coating layer formed on the negative electrode current collector, wherein the positive electrode current collector comprises a disk-shaped positive electrode disk part, and a cylindrical-shaped positive electrode cylinder part extended from one surface of the positive electrode disk part, wherein the negative electrode current collector comprises a disk-shaped negative electrode disk part, and a cylindrical-shaped negative electrode cylinder part extended from one surface of the negative electrode disk part, and wherein the positive electrode member and the negative electrode member are assembled so that the posi- (Continued)

tive electrode cylinder part and the negative electrode cylinder part are adjacent to each other.

13 Claims, 11 Drawing Sheets

(51) Int. Cl.
*H01M 4/04* (2006.01)
*H01M 4/36* (2006.01)

(56) References Cited

U.S. PATENT DOCUMENTS

| | | |
|---|---|---|
| 2002/0142211 A1 | 10/2002 | Nakanishi et al. |
| 2004/0128826 A1 | 7/2004 | Nakanishi et al. |
| 2004/0131930 A1 | 7/2004 | Nakanishi et al. |
| 2004/0247998 A1 | 12/2004 | Nakanishi et al. |
| 2005/0186474 A1* | 8/2005 | Jiang ............ H01M 4/525 427/126.6 |
| 2007/0037028 A1 | 2/2007 | Chiang et al. |
| 2012/0003506 A1 | 1/2012 | Shin |
| 2019/0355972 A1 | 11/2019 | Lee et al. |
| 2021/0257662 A1 | 8/2021 | Ko et al. |

FOREIGN PATENT DOCUMENTS

| | | |
|---|---|---|
| JP | 2007-134296 A | 5/2007 |
| KR | 10-2005-0070724 A | 7/2005 |
| KR | 10-0675700 B1 | 2/2007 |
| KR | 10-2012-0002861 A | 1/2012 |
| KR | 10-2020-0039214 A | 4/2020 |
| KR | 10-2255126 B1 | 5/2021 |

* cited by examiner

[FIG. 1]

CONVENTIONAL ART

[FIG. 2]

CONVENTIONAL ART

ELECTRODE ASSEMBLY AND MANUFACTURING METHOD OF THE SAME

TECHNICAL FIELD

The present disclosure relates to an electrode assembly and a manufacturing method of the same, and more particularly, to an electrode assembly having a novel structure capable of reducing resistance, and a manufacturing method of the same.

BACKGROUND

Recently, as energy source price is increasing due to the depletion of fossil fuels and increasing interest is being paid to environmental pollution, the demand for environmentally-friendly alternative energy sources is bound to play an important role in the future life. Thus, research into techniques for generating various kinds of power, such as nuclear energy, solar energy, wind energy, and tidal power, is underway, and power storage apparatuses for more efficient use of the generated energy are also drawing much attention.

In particular, as technology development and demands for mobile devices increase, the demand for batteries as energy sources is rapidly increasing. Accordingly, many researches on batteries capable of meeting diverse demands have been conducted.

Typically, the demand for the lithium secondary batten, such as a lithium ion battery or a lithium ion polymer battery, which have advantages such as a high energy density, a discharge voltage, an output stability, and the like is high.

The secondary battery may be classified based on the structure of an electrode assembly having a structure in which a positive electrode and a negative electrode are stacked with a separator being interposed the positive electrode and the negative electrode.

Typically, there may mentioned, for example, a jelly roll electrode assembly having a structure in which long sheets of positive electrodes and negative electrodes are wound with a separator being interposed therebetween, a stacked type electrode assembly having a structure in which pluralities of positive electrodes and negative electrodes, cut by a certain size unit, are sequentially stacked with separators being interposed therebetween, or the like.

Further, based on the shape of a battery case, such a secondary battery may be classified into a cylindrical battery where an electrode assembly is built into a cylindrical case, or a prismatic battery where an electrode assembly is built into a prismatic metal can. Further, it may can be classified into a pouch type battery where an electrode assembly is built into a pouch type case formed of an aluminum laminate sheet.

The cylindrical battery has the advantage of having relatively large capacity and being structurally stable, and the jelly roll electrode assembly is usually applied to the cylindrical battery.

Figure 1:
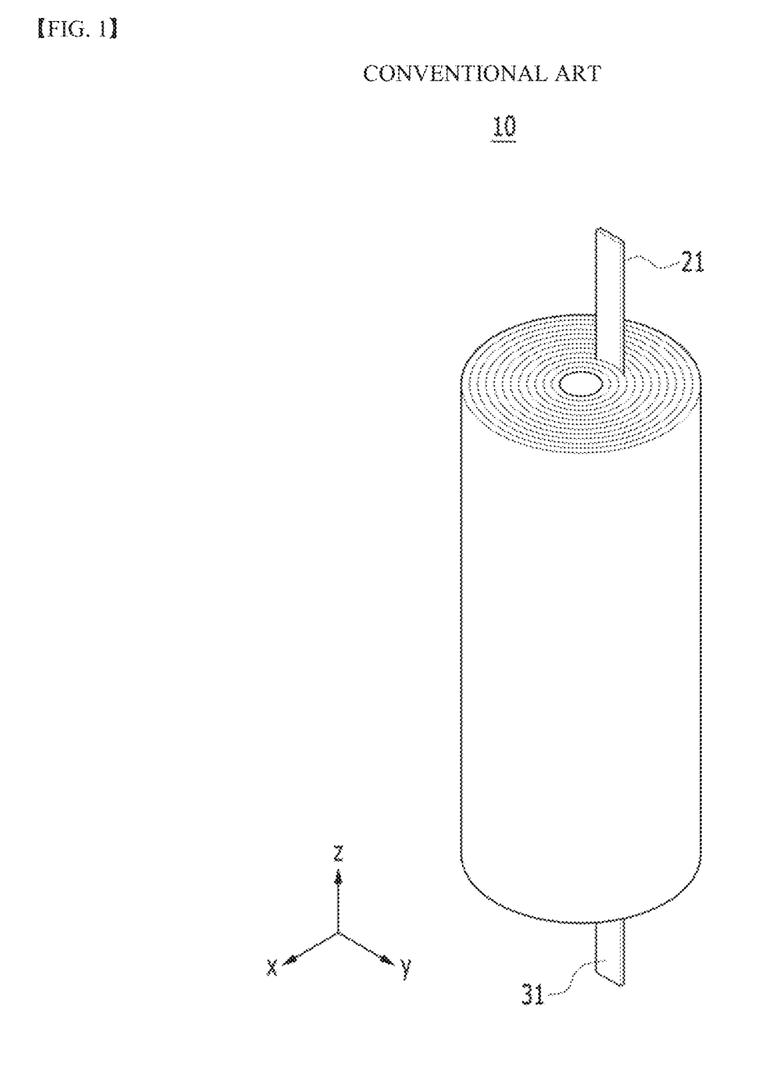
FIG. 1 is a perspective view showing a conventional jelly roll electrode assembly.
Figure 2:
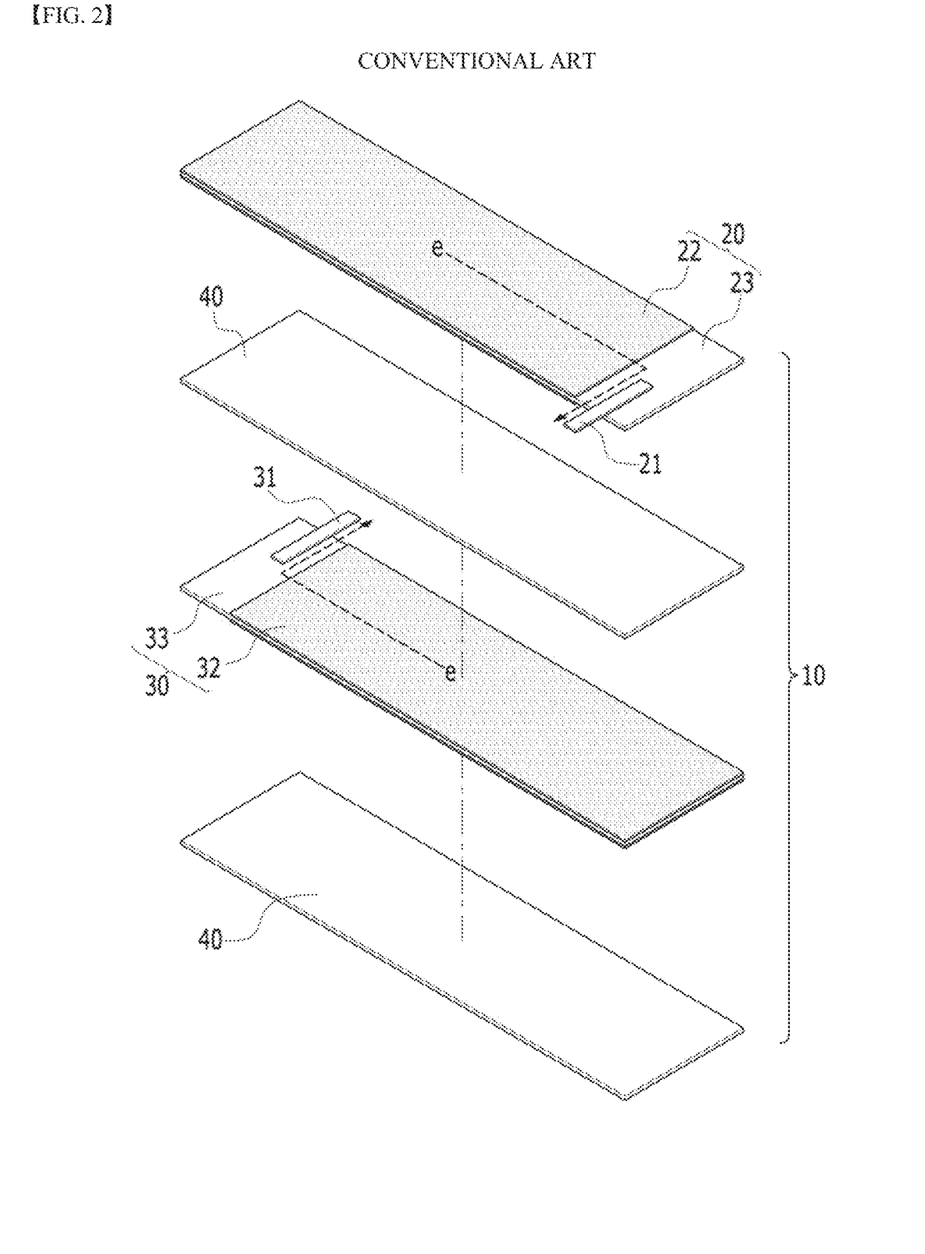
FIG. 2 is an exploded perspective view showing a state before the jelly roll electrode assembly of FIG. 1 is wound.

FIG. 1 is a perspective view showing a conventional jelly roll electrode assembly. FIG. 2 is an exploded perspective view showing a state before the jelly roll electrode assembly of FIG. 1 is wound.

Referring to FIGS. 1 and 2, a conventional jelly roll electrode assembly 10 inserted into a secondary battery includes a positive electrode sheet 20, a negative electrode sheet 30, and a separator 40 interposed between the positive electrode sheet 20 and the negative electrode sheet 30. In addition, in order to prevent the positive electrode sheet 20 and the negative electrode sheet 30 from contacting each other when wound like jelly roll, it is preferable that the separator 40 is further arranged under the negative electrode sheet 30.

The positive electrode sheet 20 may include a positive electrode current collector 23 formed of a thin metal plate and a positive electrode active material layer 22 formed on the positive electrode current collector 23. The positive electrode active material layer 22 can be formed by applying the positive electrode active material onto the positive electrode current collector 23. Further, a positive electrode tab 21 may be joined to a portion where a part of the positive electrode current collector 23 is exposed without applying the positive electrode active material.

The negative electrode sheet 30 may include, similarly, a negative electrode current collector 33 formed of a thin metal plate and a negative electrode active material layer 32 formed on the negative electrode current collector 33. The negative electrode active material layer 22 can be formed by applying the negative electrode active material onto the negative electrode current collector 33. Further, a negative electrode tab 31 may be joined to a portion where a part of the negative electrode current collector 33 is exposed without applying the negative electrode active material.

In the case of the conventional jelly roll electrode assembly 10, the positive electrode tab 21 and the negative electrode tab 31 function as a path through which electrons move. Specifically, as shown in FIG. 2, when a reaction occurs in a specific portion of the jelly roll electrode assembly 10 by the charging and discharging, electron (e) moves from the corresponding portion to the positive electrode tab 21 or the negative electrode tab 31.

In the case of the jelly roll electrode assembly 10, since it has a form in which the positive electrode tab 21 and the negative electrode tab 31 having a very narrow width are attached to the positive electrode sheet 20 and the negative electrode sheet 30 in the form of a long sheet, there is a drawback that movement of the electron (e) is limited and resistance is high. In order to realize the high output secondary battery, a method capable of reducing the resistance is needed.

DETAILED DESCRIPTION OF THE INVENTION

Technical Problem

It is an object of the present disclosure to provide an electrode assembly with a novel structure that can be applied to cylindrical batteries and at the same time reduce resistance, and a method of manufacturing the same.

However, the problem to be solved by the embodiments of the present disclosure is not limited to the above-described problems, and can be variously expanded within the scope of the technical idea included in the present disclosure.

Technical Solution

According to one embodiment of the present disclosure, there is provided an electrode assembly comprising: a positive electrode member including a positive electrode current collector and a positive electrode active material coating layer formed on the positive electrode current collector; and a negative electrode member including a negative electrode current collector and a negative active material coating layer formed on the negative electrode current collector, wherein the positive electrode current collector comprises a disk-shaped positive electrode disk part, and a cylindrical-shaped positive electrode cylinder part extending from one surface of the positive electrode disk part, wherein the positive electrode active material coating layer is formed on a surface of the positive electrode cylinder part, wherein the negative electrode current collector comprises a disk-shaped negative electrode disk part, and a cylindrical-shaped negative electrode cylinder part extending from one surface of the negative electrode disk part, wherein the negative electrode active material coating layer is formed on a surface of the negative electrode cylinder part, and wherein the positive electrode member and the negative electrode member are assembled so that the positive electrode cylinder part and the negative electrode cylinder part are adjacent to each other.

A solid electrolyte coating layer may be formed on at least one surface of the positive electrode active material coating layer or at least one surface of the negative electrode active material coating layer.

As the positive electrode member and the negative electrode member are assembled, the solid electrolyte coating layer may be located between the positive electrode active material coating layer and the negative electrode active material coating layer.

The positive electrode cylinder part may be composed of a plurality of positive electrode cylinder parts, and the plurality of positive electrode cylinder parts may be arranged on the positive electrode disk part so as to have a same center and have different diameters, respectively. The negative electrode cylinder part may be composed of a plurality of negative electrode cylinder parts, and the plurality of negative electrode cylinder parts may be arranged on the negative electrode disk part so as to have a same center and have different diameters, respectively.

Any one of the positive electrode cylinder parts may be located between two adjacent negative electrode cylinder parts.

Any one of the negative electrode cylinder parts may be located between two adjacent positive electrode cylinder parts.

According to another embodiment of the present disclosure, there is provided a method of manufacturing an electrode assembly, comprising the steps of: forming a positive electrode active material coating layer on a positive electrode current collector to form a positive electrode member; forming a negative electrode active material coating layer on a negative electrode current collector to form a negative electrode member; and an assembling step for assembling the positive electrode member and the negative electrode member, wherein the positive electrode current collector comprises a disk-shaped positive electrode disk part, and a cylindrical-shaped positive electrode cylinder part extending from one surface of the positive electrode disk part, wherein the positive electrode active material coating layer is formed on a surface of the positive electrode cylinder part, wherein the negative electrode current collector comprises a disk-shaped negative electrode disk part, and a cylindrical-shaped negative electrode cylinder part extending from one surface of the negative electrode disk part, wherein the negative electrode active material coating layer is formed on a surface of the negative electrode cylinder part, and wherein, in the assembling step, the positive electrode member and the negative electrode member are assembled so that the positive electrode cylinder part and the negative electrode cylinder part are adjacent to each other.

The method of manufacturing an electrode assembly may further include a step of forming a solid electrolyte coating layer on at least one surface of the positive electrode active material coating layer or at least one surface of the negative electrode active material coating layer.

The step of forming a solid electrolyte coating layer may include a step of injecting a liquid electrolyte onto at least one surface of the positive electrode active material coating layer and the negative electrode active material coating layer, and then solidifying the liquid electrolyte into a solid.

In the assembling step, as the positive electrode member and the negative electrode member are assembled, the solid electrolyte coating layer may be located between the positive electrode active material coating layer and the negative electrode active material coating layer.

The positive electrode cylinder part may be composed of a plurality of positive electrode cylinder parts, and the plurality of positive electrode cylinder parts may be arranged on the positive electrode disk part so as to have a same center and have different diameters, respectively. The negative electrode cylinder part may be composed of a plurality of negative electrode cylinder parts, and the plurality of negative electrode cylinder parts may be arranged on a negative electrode disk part so as to have the same center and have different diameters, respectively. In the assembling step, the positive electrode member and the negative electrode member may be assembled so that any one of the positive electrode cylinder parts is located between two adjacent negative electrode cylinder parts, and any one of the negative electrode cylinder parts is located between two adjacent positive electrode cylinder parts.

The step of forming a positive electrode member may include a step of immersing in and taking out the positive electrode cylinder part from a positive electrode active material slurry and then drying the positive electrode cylinder part to form the positive electrode active material coating layer.

The step of forming a negative electrode member may include a step of immersing in and taking out the negative electrode cylinder part from a negative electrode active material slurry and then drying the negative electrode cylinder part to form the negative electrode active material coating layer.

Advantageous Effects

According to the embodiments of the present disclosure, an electrode assembly with a novel structure that can replace the conventional jelly roll electrode assembly can be provided by utilizing the electrode current collector having a disk part and a cylinder part.

Similar to the conventional jelly roll electrode assembly, the step of winding the electrode sheet is unnecessary, and thus, the effect of improving the manufacturing processability and shortening the manufacturing time can be expected.

Further, since electron movement using the electrode tab is not required, the effect of reducing resistance can be expected.

The effects of the present disclosure are not limited to the effects mentioned above and additional other effects not described above will be clearly understood from the description of the appended claims by those skilled in the art.

DETAILED DESCRIPTION OF THE EMBODIMENTS

Hereinafter, various embodiments of the present disclosure will be described in detail with reference to the accompanying drawings so that those skilled in the art can easily cane out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross portion cut vertically.

Figure 3:
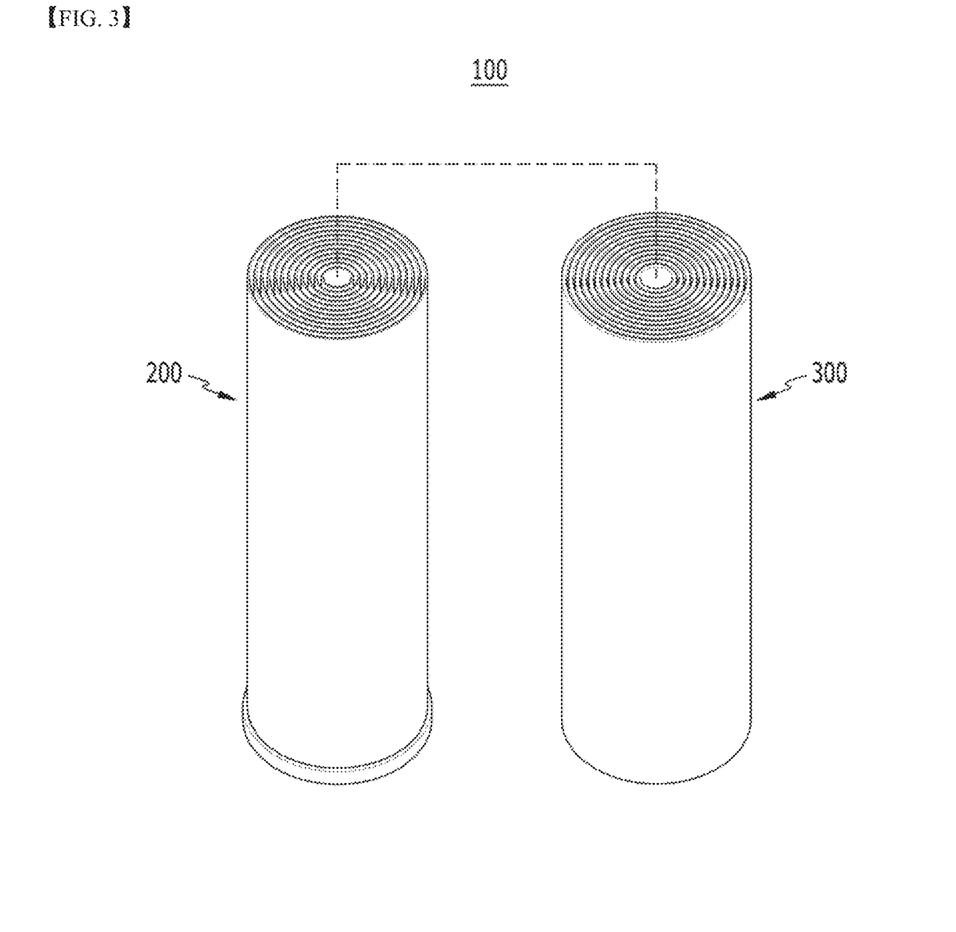
FIG. 3 is an exploded perspective view showing an electrode assembly according to an embodiment of the present disclosure.

FIG. 3 is an exploded perspective view showing an electrode assembly according to an embodiment of the present disclosure.

Referring to FIG. 3, the electrode assembly 100 according to one embodiment of the present disclosure includes a positive electrode member 200 and a negative electrode member 300. The positive electrode member 200 and the negative electrode member 300 can be assembled to manufacture a cylindrical electrode assembly 100.

First, the positive electrode member 200 according to the present embodiment will be described in detail with reference to FIGS. 4 and 5.

Figure 4:
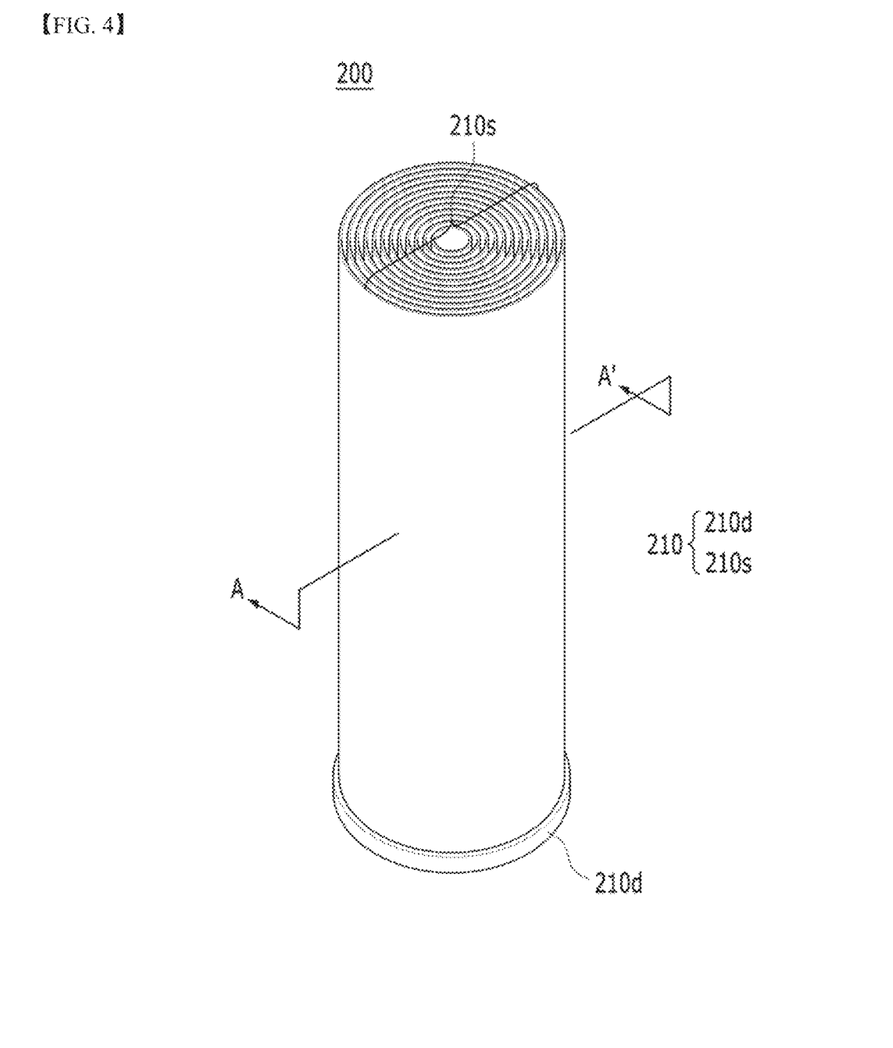
FIG. 4 is a perspective view showing a positive electrode member included in the electrode assembly of FIG. 3.

FIG. 4 is a perspective view showing a positive electrode member included in the electrode assembly of FIG. 3. FIG. 5 is a cross-sectional view showing a cross-section taken along the cutting line A-A' of FIG. 4.

Figure 5:
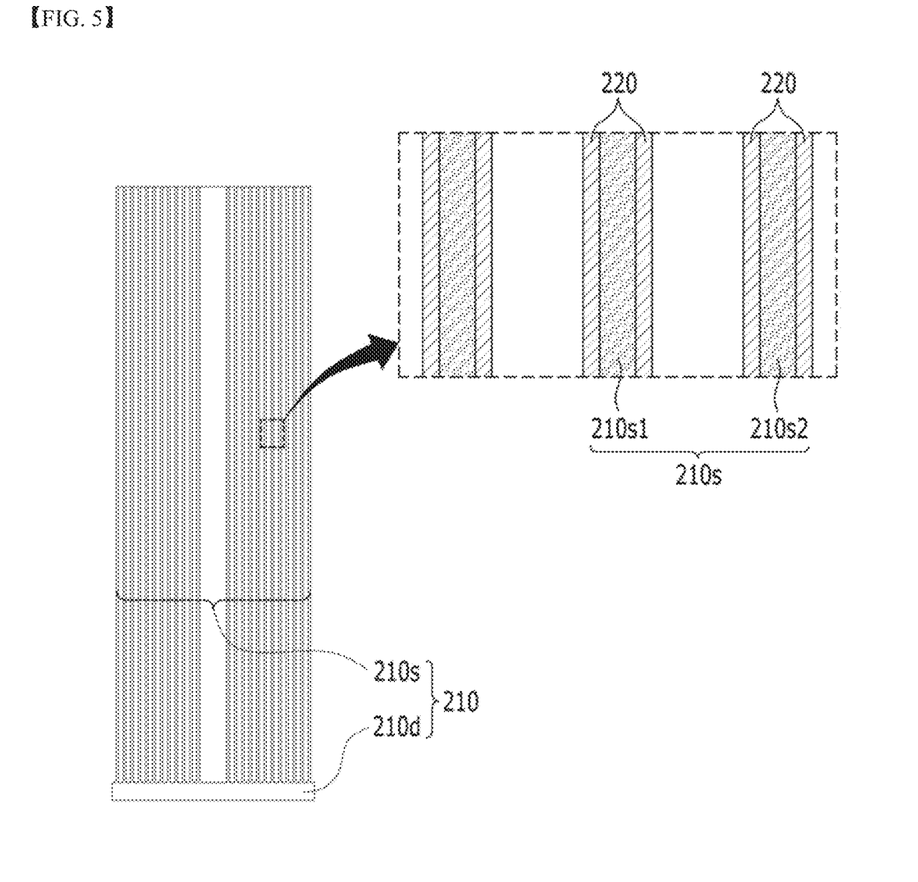
FIG. 5 is a cross-sectional view showing a cross-section taken along the cutting line A-A' of FIG. 4.

Referring to FIGS. 4 and 5, the positive electrode member 200 according to the present embodiment includes a positive electrode current collector 210 and a positive electrode active material coating layer 220 formed on the positive electrode current collector 210. The positive electrode current collector 210 includes a disk-shaped positive electrode disk part 210d, and a cylindrical-shaped positive electrode cylinder part 210s extended from one surface of the positive electrode disk part 210d. The positive electrode active material coating layer 220 is formed on the surface of the positive electrode cylinder part 210s among the positive electrode current collectors 210.

More specifically, the positive electrode cylinder part 210s can be composed of a plurality of positive electrode cylinder parts. The plurality of the positive electrode cylinder parts 210s may be arranged on the positive electrode disk part 210d so as to have the same center and have different diameters, respectively. That is, the cylindrical-shaped positive electrode cylinder parts 210s that is empty in its inside may be concentrically arranged on the positive electrode disk part 210d. In particular, as shown in FIG. 5, the plurality of the positive electrode cylinder parts 210s are spaced apart from each other at regular intervals, and the positive electrode active material coating layer 220 may be formed on the respective surfaces of the plurality of positive electrode cylinder parts 210s.

Any two of the positive electrode cylinder parts 210s adjacent to each other are referred to as a first positive electrode cylinder part 210s1 and a second positive electrode cylinder part 210s2. The first positive electrode cylinder part 210s1 and the second positive electrode cylinder part 210s2 have a cylindrical shape that is empty in its inside, and they are concentric circles having different diameters but having the same center on the basis of the cross-section in the horizontal direction. A positive electrode active material coating layer 220 may be formed on both surfaces of the first positive electrode cylinder part 210s1 and the second positive electrode cylinder part 210s2.

Next, the negative electrode member 300 according to the present embodiment will be described in detail with reference to FIGS. 6 and 7.

Figure 6:
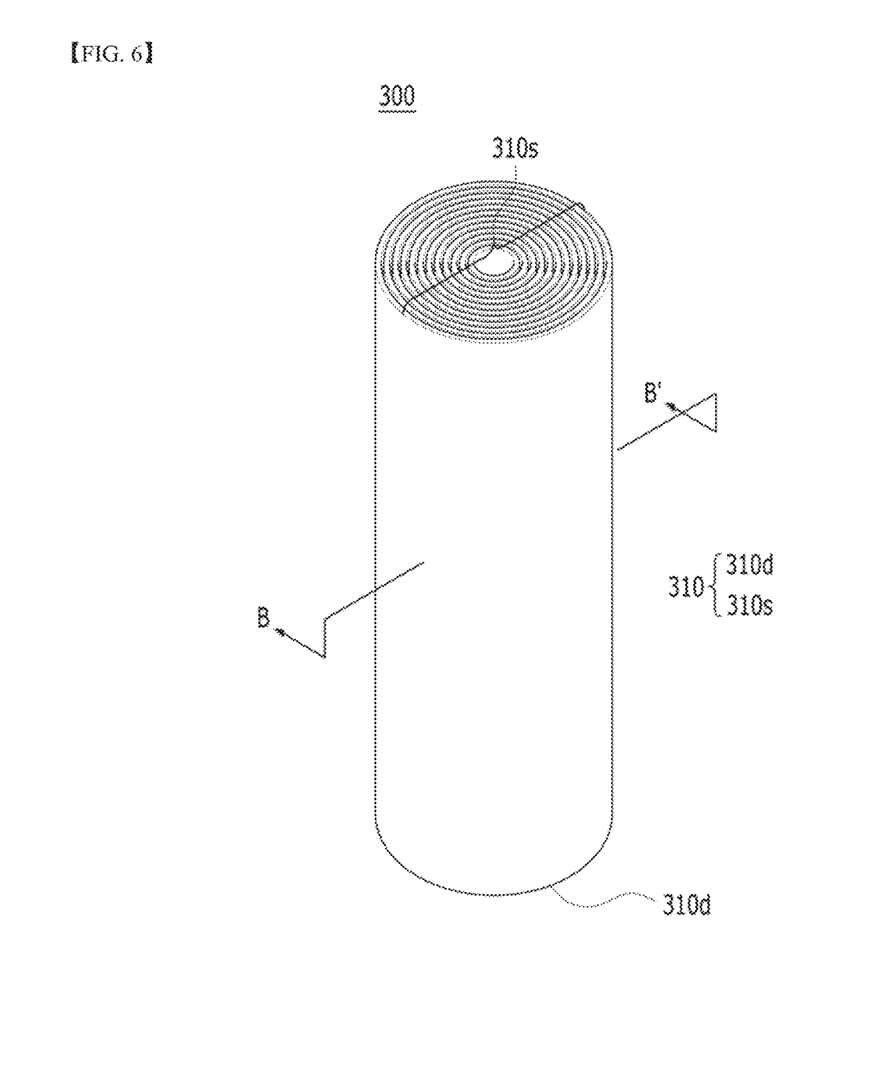
FIG. 6 is a perspective view showing a negative electrode member included in the electrode assembly of FIG. 3.

FIG. 6 is a perspective view showing a negative electrode member included in the electrode assembly of FIG. 3. FIG. 7 is a cross-sectional view showing a cross-section taken along the cutting line B-B' of FIG. 6.

Figure 7:
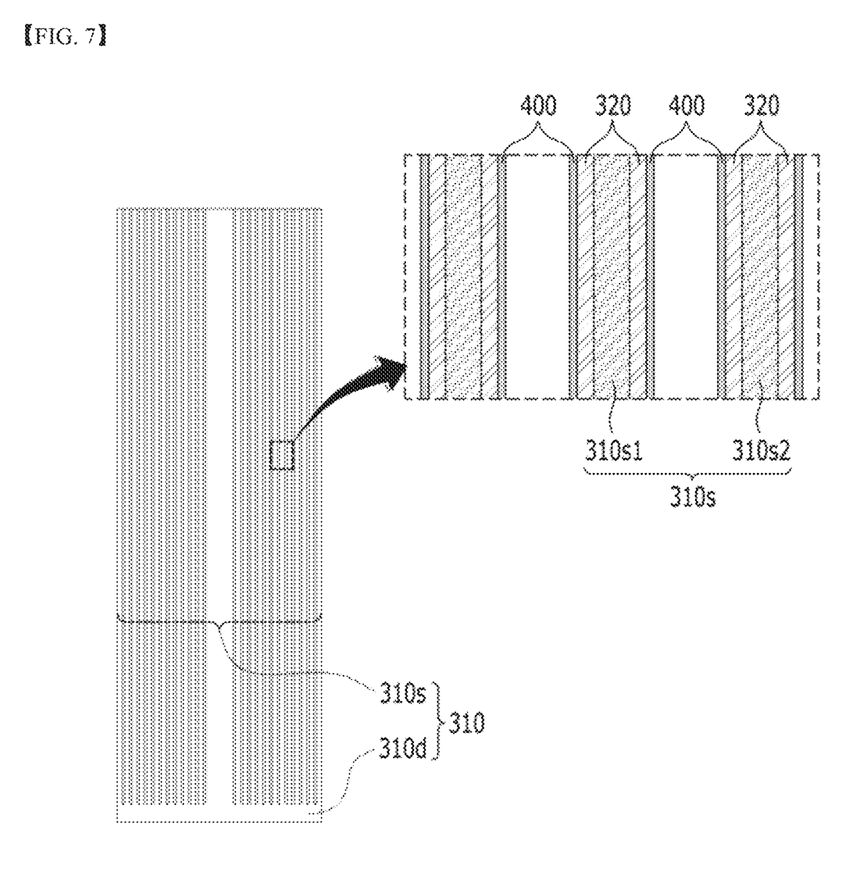
FIG. 7 is a cross-sectional view showing a cross-section taken along the cutting line B-B' of FIG. 6.

Referring to FIGS. 6 and 7, the negative electrode member 300 according to the present embodiment includes a negative electrode current collector 310, and a negative electrode active material coating layer 320 formed on the negative electrode current collector 310. The negative electrode current collector 310 includes a disk-shaped negative electrode disk part 310d and a cylindrical negative electrode cylinder part 310s extended from one surface of the negative electrode disk part 310d. The negative electrode active material coating layer 320 is formed on the surface of the negative electrode cylinder part 310*s* among the negative electrode current collectors 310.

More specifically, the negative electrode cylinder part 310*s* can be composed of a plurality of negative electrode cylinder parts. The plurality of the negative electrode cylinder parts 310*s* may be arranged on the negative electrode disk part 310*d* so as to have the same center and have different diameters, respectively. That is, the negative electrode cylinder parts 310*s* having a cylindrical shape that is empty in its inside may be concentrically arranged on the negative electrode disk part 310*d*. In particular, as shown in FIG. 7, the plurality of negative cylinder parts 310*s* are spaced apart from each other at regular intervals, and the negative electrode active material coating layer 320 may be formed on the surface of each of the plurality of negative electrode cylinder parts 310*s*.

Any two of the negative electrode cylinder parts 310*s* adjacent to each other are referred to as a first negative electrode cylinder part 310*s*1 and a second negative electrode cylinder part 310*s*2. The first negative electrode cylinder part 310*s*1 and the second negative electrode cylinder part 310*s*2 have a cylindrical shape that is empty in its inside, and they are concentric circles having different diameters with the same center on the basis of the cross-section in the horizontal direction. A negative electrode active material coating layer 320 may be formed on both surfaces of the first negative electrode cylinder part 310*s*1 and the second negative electrode cylinder part 310*s*2.

Meanwhile, according to the present embodiment, a solid electrolyte coating layer 400 may be formed on at least one surface of the positive electrode active material coating layer 220 and the negative electrode active material coating layer 320. In one example, as shown in FIG. 7, the solid electrolyte coating layer 400 may be formed on the surface of the negative electrode active material coating layer 320. A negative active material coating layer 320 is formed on the surface of the negative cylinder part 310*s*, and a solid electrolyte coating layer 400 may be formed on the surface of the negative electrode active material coating layer 320. Although not specifically shown in the figure, in another embodiment of the present disclosure, a solid electrolyte coating layer may be formed on the surface of the positive electrode active material coating layer 220.

Next, an assembling form of the positive electrode member 200 and the negative electrode member 300 will be described in detail with reference to FIGS. 8 and 9, and the like.

Figure 8:
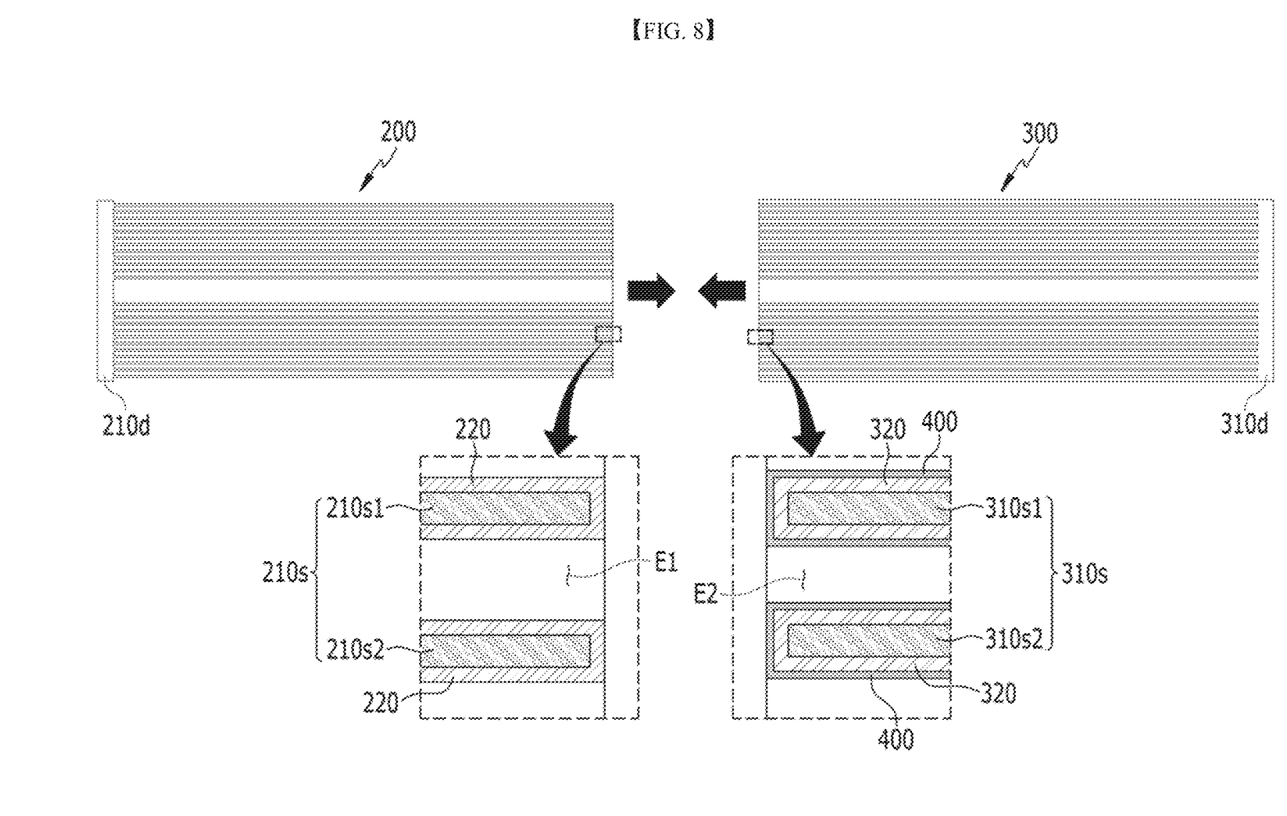
FIG. 8 is a cross-sectional view showing an assembling form of a positive electrode member and a negative electrode member included in the electrode assembly of FIG. 3.

FIG. 8 is a cross-sectional view showing an assembling form of a positive electrode member and a negative electrode member included in the electrode assembly of FIG. 3. FIG. 9 is a cross-sectional view showing an electrode assembly in a state where the positive electrode member and the negative electrode member of FIG. 8 are assembled.

Figure 9:
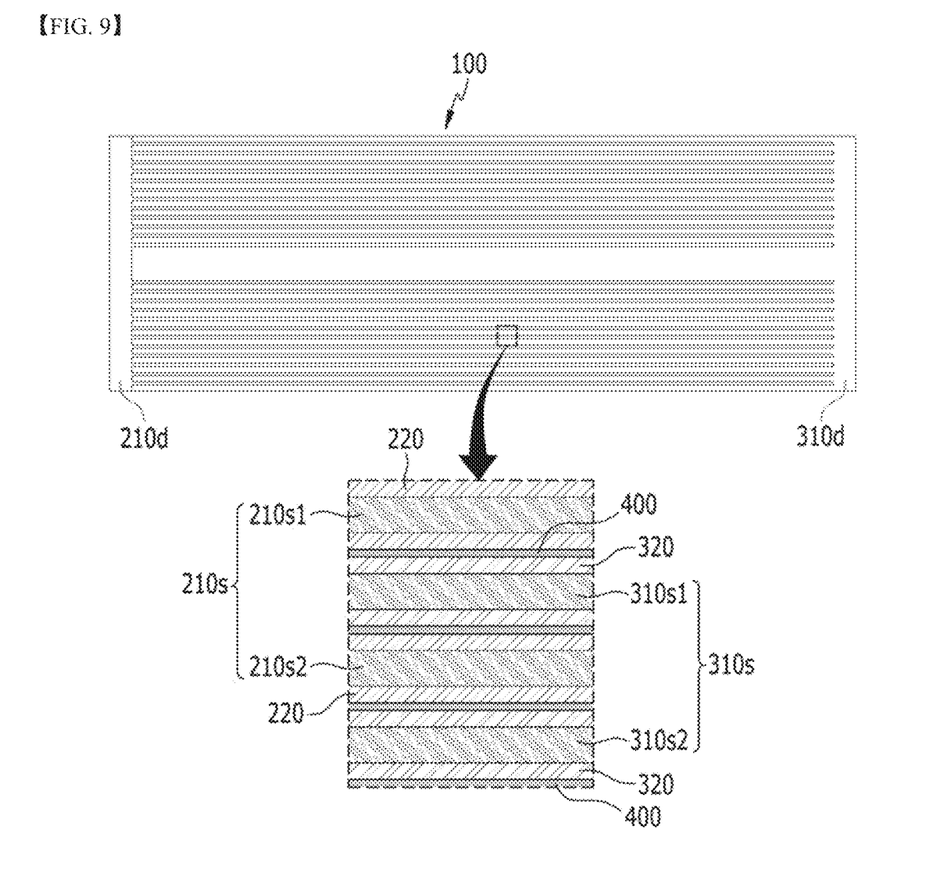
FIG. 9 is a cross-sectional view showing an electrode assembly in a state where the positive electrode member and the negative electrode member of FIG. 8 are assembled.

Referring to FIGS. 8 and 9 together with FIGS. 3 to 7, the positive electrode member 200 and the negative electrode member 300 are assembled to each other so that the positive electrode cylinder part 210*s* and the negative electrode cylinder part 310*s* are adjacent to each other. By assembling the positive electrode member 200 and the negative electrode member 300, the cylindrical-shaped electrode assembly 100 may be manufactured.

As described above, the positive electrode cylinder part 210*s* is composed of a plurality of positive electrode cylinder parts, and the plurality of positive electrode cylinder parts 210*s* may be arranged on the positive electrode disk part 210*d* so as to have the same center and have different diameters, respectively. The plurality of negative electrode cylinder parts 310*s* may be, similarly, composed of a plurality of negative electrode cylinder parts, and the plurality of the negative electrode cylinder parts 310*s* may be arranged on the negative electrode disk part 310*d* to have the same center and have different diameters, respectively.

As the positive electrode member 200 and the negative electrode member 300 are assembled with each other, whereby any one of the positive electrode cylinder parts 210*s* may be located between the two negative electrode cylinder parts 310*s*, and any one of the negative electrode cylinder parts 310*s* may be located between the two positive electrode cylinder parts 210*s*. That is, the positive electrode cylinder part 310*s* is inserted between the separated positive electrode cylinder parts 210*s*, and the positive electrode cylinder part 210*s* is inserted between the separated negative electrode cylinder parts 310*s*.

More specifically, any one of the negative electrode cylinder parts 310*s* is inserted into a space E1 between the first positive electrode cylinder part 210*s*1 and the second positive electrode cylinder part 210*s*2, and any one of the positive electrode cylinder parts 210*s* may be inserted into the space E2 between the first negative electrode cylinder part 310*s*1 and the second negative electrode cylinder part 310*s*2.

By being assembled in the same manner as described above, the positive electrode cylinder part 210*s* and the negative electrode cylinder part 310*s* may be alternately located as they go from the center to the outer periphery of the assembled cylindrical-shaped electrode assembly 100.

Meanwhile, the solid electrolyte coating layer 400 may be formed on at least on surface of the positive active material coating layer 220 and the negative active material coating layer 320. As the positive electrode member 200 and the negative electrode member 300 are assembled in the same manner as described above, the solid electrolyte coating layer 400 may be located between the positive electrode active material coating layer 220 and the negative electrode active material coating layer 320. The solid electrolyte coating layer 400 is an electrolyte layer of a solid rather than a liquid, and the electrode assembly 100 including such a solid electrolyte coating layer 400 may be a kind of all-solid-state battery. By providing such a solid electrolyte coating layer 400, it is possible to limit the direct contact between the positive active material coating layer 220 and the negative active material coating layer 320.

Meanwhile, in the assembled cylindrical-shaped electrode assembly 100, the positive electrode disk part 210*d* and the negative electrode disk part 310*d* are located on the sides opposite to each other. The positive electrode disk part 210*d* and the negative electrode disk part 310*d* may function as a kind of electrode terminal.

In the case of the conventional jelly roll electrode assembly 10 (see FIG. 2), the positive electrode tab 21 or the negative electrode tab 31 is provided as the electron movement path, whereas in the case of the electrode assembly 100 according to the present embodiment, the positive electrode disk part 210*d* and the negative electrode disk part 310*d* may be provided as electrode terminals, whereby the conventional positive electrode tab 21 or negative electrode tab 31 is unnecessary.

When a reaction occurs in a specific portion of the electrode assembly 100 by the charging and discharging, electrons move through the positive electrode cylinder part 210*s* and the positive electrode disk part 210*d* or the negative electrode cylinder part 310*s* and the negative electrode disk part 310*d*. Since the current moves through the positive electrode disk part 210*d* and the negative electrode disk part 310d in the form of a disk instead of the positive electrode tab 21 or the negative electrode tab 31 having a very narrow width, it has the advantage in that resistance can be significantly reduced.

Further, since it is a method of assembling the positive electrode member 200 and the negative electrode member 300 so that the positive electrode cylinder part 210s and the negative electrode cylinder part 310s are alternately located, the conventional process of winding an electrode sheet is unnecessary. Therefore, compared to the conventional case, the manufacturing processability is improved, and the manufacturing time of the electrode assembly can be shortened.

Hereinafter, a method of manufacturing an electrode assembly according to an embodiment of the present disclosure will be described in detail. However, portions overlapping with those described above will be omitted.

Referring to FIGS. 3 to 9, the method of manufacturing the electrode assembly 100 according to an embodiment of the present disclosure includes a step of forming a positive electrode active material coating layer 220 on a positive electrode current collector 210 to form a positive electrode member 200; a step of forming a negative electrode active material coating layer 320 on a negative electrode current collector 310 to form a negative electrode member 300; and a step of assembling the positive electrode member 200 and the negative electrode member 300.

The positive electrode current collector 210 includes a disk-shaped positive electrode disk part 210d, and a cylindrical-shaped positive electrode cylinder part 210s extended from one surface of the positive electrode disk part 210d. The positive electrode active material coating layer 220 is formed on the surface of the positive electrode cylinder part 210s among the positive electrode current collectors 210. The positive electrode cylinder part 210s may be composed of a plurality of positive electrode cylinder parts. The plurality of the positive electrode cylinder parts 210s may be arranged on the positive electrode disk part 210d so as to have the same center and have different diameters, respectively. That is, the plurality of the positive electrode cylinder parts 210s may be concentric on the basis of a cross-section in a horizontal direction.

The negative electrode current collector 310 includes a disk-shaped negative electrode disk part 310d and a cylindrical-shaped negative electrode cylinder part 310s extended from one surface of the negative electrode disk part 310d. The negative electrode active material coating layer 320 is formed on the surface of the negative electrode cylinder part 310s among the negative electrode current collectors 310. The negative electrode cylinder part 310s may be composed of a plurality of negative electrode cylinder parts. The plurality of negative electrode cylinder parts 310s may be arranged on the negative electrode disk part 310d so as to have the same center and have different diameters, respectively. That is, the plurality of the negative electrode cylinder parts 310s may be concentric on the basis of a cross-section in a horizontal direction.

Referring back to FIGS. 8 and 9, in the assembling step, the positive electrode member 200 and the negative electrode member 300 may be assembled so that the positive electrode cylinder part 210s and the negative electrode cylinder part 310s are adjacent to each other. In a state where the positive electrode disk part 210d and the negative electrode disk part 310d are located on the sides opposite to each other, the positive electrode member 200 and the negative electrode member 300 are assembled toward each other to manufacture a cylindrical-shape electrode assembly 100.

Specifically, in the assembling step, the positive electrode member 200 and the negative electrode member 300 may be assembled so that any one of the positive electrode cylinder parts 210s is located between the two negative electrode cylinder parts 310s, and any one of the negative electrode cylinder parts 310s is located between the two positive electrode cylinder parts 210s. More specifically, any one of the negative electrode cylinder parts 310s is inserted into the space E1 between the first positive electrode cylinder part 210s1 and the second positive electrode cylinder part 210s2, and any one of the positive electrode cylinder parts 210s may be inserted into the space E2 between the first negative electrode cylinder part 310s1 and the second negative electrode cylinder part 310s2. By being assembled in the same manner as described above, the positive electrode cylinder part 210s and the negative electrode cylinder part 310s may be alternately located as they go from the center to the outer periphery of the assembled cylindrical electrode assembly 100.

Next, the step of forming the positive electrode member and the step of forming the negative electrode member will be described in detail with reference to FIGS. 10 and 11.

Figure 10:
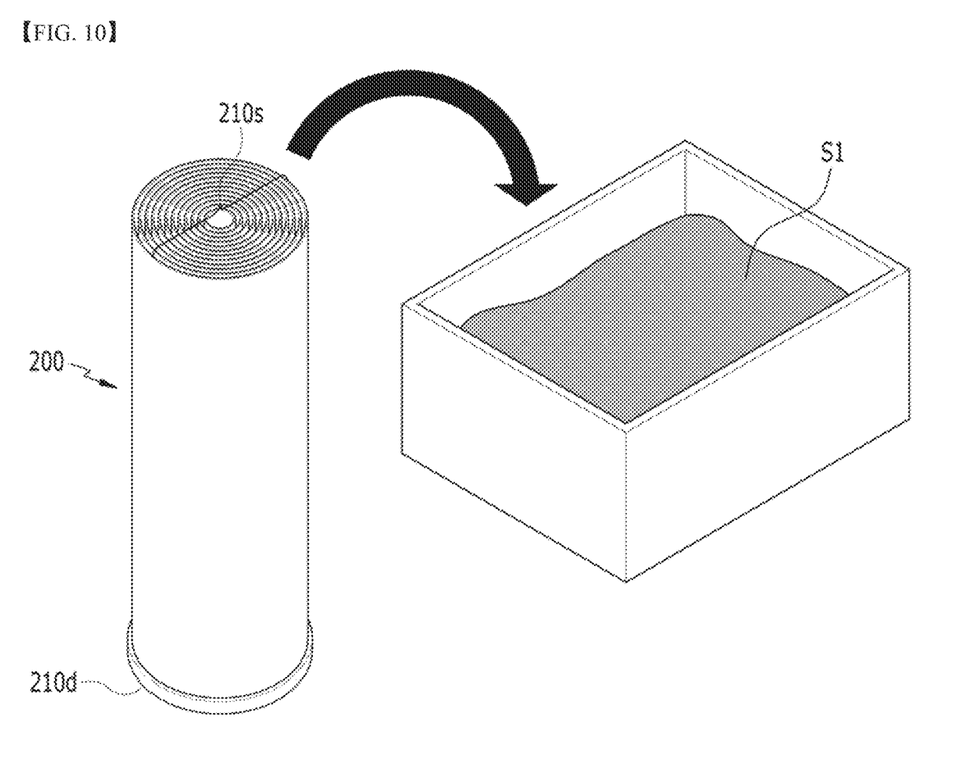
FIG. 10 is a schematic diagram for explaining a step of forming a positive electrode member according to an embodiment of the present disclosure.

FIG. 10 is a schematic diagram for explaining a step of forming a positive electrode member according to an embodiment of the present disclosure. FIG. 11 is a schematic diagram for explaining a step of forming a negative electrode member according to an embodiment of the present disclosure.

First, referring to FIG. 10, the step of forming a positive electrode member 200 according to the present embodiment may include a step of immersing and taking out the positive electrode cylinder part 210s in the positive electrode active material slurry S1 and then drying it to form the positive electrode active material coating layer 220 (see FIG. 5). That is, only the positive electrode cylinder part 210s among the positive electrode disk part 210d and the positive electrode cylinder part 210s is immersed and taken out in the positive electrode active material slurry S1 and then dried, so that the positive electrode active material coating layer 220 can be formed on the surface of the positive electrode cylinder part 210s.

The positive electrode active material slurry S1 is a slurry containing the positive electrode active material. Specifically, the positive electrode active material may be a layered compound such as lithium cobalt oxide ($LiCoO_2$) or lithium nickel oxide ($LiNiO_2$) or a compound substituted with one or more transition metals; lithium manganese oxides such as chemical formula $Li_{1+x}Mn_{2-x}O_4$ (where, x is 0 to 0.33), $LiMnO_3$, $LiMn_2O_3$, $LiMnO_2$; lithium copper oxide ($Li_2CuO_2$); vanadium oxides such as $LiV_3O_8$, $LiFe_3O_4$, $V_2O_5$, and $Cu_2V_2O_7$; a Ni-site type lithium nickel oxide represented by chemical formula $LiNi_{1-x}M_xO_2$ (where, M=Co, Mn, Al, Cu, Fe, Mg, B or Ga, and x=0.01 to 0.3); lithium manganese composite oxide represented by chemical formula $LiMn_{2-x}M_xO_2$ (where, M=Co, Ni, Fe, Cr, Zn or Ta, and x=0.01 to 0.1) or $Li_2Mn_3MO_8$ (where, M=Fe, Co, Ni, Cu or Zn); $LiMn_2O_4$ with a Li portion of chemical formula substituted with an alkaline earth metal ion; a disulfide compound; $Fe_2(MoO_4)_3$, and the like, but is not limited thereto.

Figure 11:
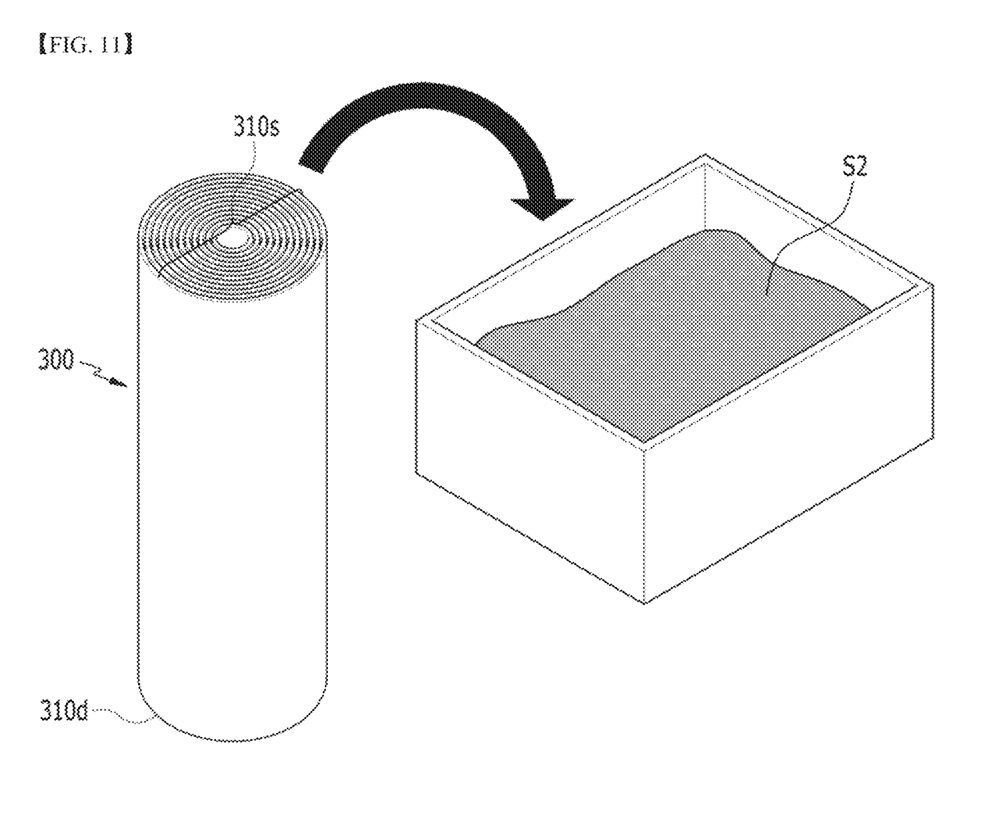
FIG. 11 is a schematic diagram for explaining a step of forming a negative electrode member according to an embodiment of the present disclosure.

Next, referring to FIG. 11, the step of forming the negative electrode member 300 according to the present embodiment includes a step of immersing and taking out the negative electrode cylinder part 310s in the negative electrode active material slurry S2 and then drying it to form the negative electrode active material coating layer 320 (see FIG. 7). That is, only the negative electrode cylinder part 310s among the negative electrode disk part 310d and the negative electrode cylinder part 310s is immersed and taken out in the negative electrode active material slurry S2 and then dried, so that the negative electrode active material coating layer 320 can be formed on the surface of the positive electrode cylinder part 310s.

The negative electrode active material slurry S2 is a slurry containing the negative electrode active material. Specifically, as the negative active material, for example, carbons such as hardly graphitizable carbon and graphite-based carbon, metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2, 3 elements in the periodic table, halogen; $0 \leq x \leq 1$; $1 \leq y \leq 3$; $1 \leq z \leq 8$); lithium metal; lithium alloys; silicon-based alloys; tin-based alloys; metal oxides such as SiO, SiO/C, $SiO_2$; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; various negative active materials such as Li—Co—Ni based materials, and the like, but is not limited thereto.

Meanwhile, the method of manufacturing the electrode assembly according to the present embodiment may further include a step of forming the solid electrolyte coating layer 400 on at least one surface of the positive electrode active material coating layer 220 and the negative electrode active material coating layer 320. The method of forming the solid electrolyte coating layer 400 is not particularly limited, but as one example, a method of injecting a liquid electrolyte onto at least one surface of the positive electrode active material coating layer 220 and the negative electrode active material coating layer 320 and then solidifying it into a solid may be used.

Referring back to FIG. 8, in the assembling step, as the positive electrode member 200 and the negative electrode member 300 are assembled, the solid electrolyte coating layer 400 may be located between the positive electrode active material coating layer 220 and the negative electrode active material coating layer 320. By providing the solid electrolyte coating layer 400, it is possible to limit the direct contact between the positive active material coating layer 220 and the negative active material coating layer 320.

Even though the terms indicating directions such as front, rear, left, right, upper and lower directions are used herein, it would be obvious to those skilled in the art that these merely represent relative positions for convenience in explanation and may vary depending on a position of an observer, a position of an object, or the like.

The electrode assembly according to the present embodiment described above may be housed in a cylindrical case to form a cylindrical battery. Further, a plurality of the cylindrical batteries may be gathered to form a battery module. The battery modules can be mounted together with various control and protection systems such as a battery management system (BMS) and a cooling system to form a battery pack.

The cylindrical battery, the battery module or the battery pack can be applied to various devices. Specifically, these devices can be applied to vehicle means such as an electric bicycle, an electric vehicle, a hybrid vehicle, but the present disclosure is not limited thereto and can be applied to various devices that can use the secondary battery.

Although preferred embodiments of the present disclosure have been described in detail above, the scope of the present disclosure is not limited thereto, and various modifications and improvements made by those skilled in the art using the basic concepts of the present disclosure defined in the following claims also falls within the spirit and scope of the present disclosure.

DESCRIPTION OF REFERENCE NUMERALS

100: electrode assembly
200: positive electrode member
210d: positive electrode disk part
210s: positive electrode cylinder part
300: negative electrode member
310d: negative electrode disk part
310s: negative electrode cylinder part

The invention claimed is:

1. An electrode assembly comprising:
a positive electrode member including a positive electrode current collector and a positive electrode active material coating layer formed on the positive electrode current collector; and
a negative electrode member including a negative electrode current collector and a negative active material coating layer formed on the negative electrode current collector,
wherein the positive electrode current collector comprises:
a disk-shaped positive electrode disk part; and
a cylindrical-shaped positive electrode cylinder part extending from one surface of the positive electrode disk part, the positive electrode cylinder part being a closed loop,
wherein the positive electrode active material coating layer is formed on a surface of the positive electrode cylinder part,
wherein the negative electrode current collector comprises:
a disk-shaped negative electrode disk part; and
a cylindrical-shaped negative electrode cylinder part extending from one surface of the negative electrode disk part, the negative electrode cylinder part being a closed loop,
wherein the negative electrode active material coating layer is formed on a surface of the negative electrode cylinder part, and
wherein the positive electrode member and the negative electrode member are assembled so that the positive electrode cylinder part and the negative electrode cylinder part are adjacent to each other.

2. The electrode assembly according to claim 1, wherein:
a solid electrolyte coating layer is formed on at least one surface of the positive electrode active material coating layer or at least one surface of the negative electrode active material coating layer.

3. The electrode assembly according to claim 2, wherein:
as the positive electrode member and the negative electrode member are assembled, the solid electrolyte coating layer is located between the positive electrode active material coating layer and the negative electrode active material coating layer.

4. The electrode assembly according to claim 1, wherein:
the positive electrode cylinder part is composed of a plurality of positive electrode cylinder parts, and the plurality of positive electrode cylinder parts are arranged on the positive electrode disk part so as to have a same center and have different diameters, respectively, and
the negative electrode cylinder part is composed of a plurality of negative electrode cylinder parts, and the plurality of negative electrode cylinder parts are arranged on the negative electrode disk part so as to have a same center and have different diameters, respectively.

5. The electrode assembly according to claim 4, wherein:
any one of the positive electrode cylinder parts is located between two adjacent negative electrode cylinder parts.

6. The electrode assembly according to claim 4, wherein:
any one of the negative electrode cylinder parts is located between two adjacent positive electrode cylinder parts.

7. A method of manufacturing an electrode assembly, comprising the steps of:
   forming a positive electrode active material coating layer on a positive electrode current collector to form a positive electrode member;
   forming a negative electrode active material coating layer on a negative electrode current collector to form a negative electrode member; and
   an assembling step for assembling the positive electrode member and the negative electrode member,
   wherein the positive electrode current collector comprises:
      a disk-shaped positive electrode disk part; and
      a cylindrical-shaped positive electrode cylinder part extending from one surface of the positive electrode disk part,
   wherein the positive electrode active material coating layer is formed on a surface of the positive electrode cylinder part,
   wherein the negative electrode current collector comprises:
      a disk-shaped negative electrode disk part; and
      a cylindrical-shaped negative electrode cylinder part extending from one surface of the negative electrode disk part,
   wherein the negative electrode active material coating layer is formed on a surface of the negative electrode cylinder part, and
   wherein, in the assembling step, the positive electrode member and the negative electrode member are assembled by moving towards each other so that the positive electrode cylinder part and the negative electrode cylinder part are adjacent to each other.

8. The method of manufacturing an electrode assembly according to claim 7, further comprising:
   forming a solid electrolyte coating layer on at least one surface of the positive electrode active material coating layer or at least one surface of the negative electrode active material coating layer.

9. The method of manufacturing an electrode assembly according to claim 8, wherein:
   the step of forming a solid electrolyte coating layer comprises injecting a liquid electrolyte onto the at least one surface of the positive electrode active material coating layer or the at least one negative electrode active material coating layer, and then solidifying the liquid electrolyte into a solid.

10. The method of manufacturing an electrode assembly according to claim 8, wherein:
    in the assembling step, as the positive electrode member and the negative electrode member are assembled, the solid electrolyte coating layer is located between the positive electrode active material coating layer and the negative electrode active material coating layer.

11. The method of manufacturing an electrode assembly according to claim 7, wherein:
    the positive electrode cylinder part is composed of a plurality of positive electrode cylinder parts, and the plurality of positive electrode cylinder parts are arranged on the positive electrode disk part so as to have a same center and have different diameters, respectively,
    the negative electrode cylinder part is composed of a plurality of negative electrode cylinder parts, and the plurality of negative electrode cylinder parts are arranged on the negative electrode disk part so as to have a same center and have different diameters, respectively, and
    in the assembling step, the positive electrode member and the negative electrode member are assembled so that any one of the positive electrode cylinder parts is located between two adjacent negative electrode cylinder parts, and any one of the negative electrode cylinder parts is located between two adjacent positive electrode cylinder parts.

12. The method of manufacturing an electrode assembly according to claim 7, wherein:
    the step of forming a positive electrode member comprises immersing into and taking out the positive electrode cylinder part from a positive electrode active material slurry and then drying the positive electrode cylinder part to form the positive electrode active material coating layer.

13. The method of manufacturing an electrode assembly according to claim 7, wherein:
    the step of forming a negative electrode member comprises immersing into and taking out the negative electrode cylinder part from a negative electrode active material slurry and then drying the negative electrode cylinder part to form the negative electrode active material coating layer.

* * * * *